US012176599B2

(12) United States Patent
Baranski

(10) Patent No.: US 12,176,599 B2
(45) Date of Patent: Dec. 24, 2024

(54) GLAZING COMPRISING AN ANTENNA AND METHOD OF MANUFACTURING THE SAME AND USE OF THE SAME

(71) Applicant: Pilkington Group Limited, Nr. Ormskirk (GB)

(72) Inventor: Detlef Baranski, Marl (DE)

(73) Assignee: Pilkington Group Limited, Nr. Ormskirk (GB)

( * ) Notice: Subject to any disclaimer, the term of this patent is extended or adjusted under 35 U.S.C. 154(b) by 79 days.

(21) Appl. No.: 17/801,456

(22) PCT Filed: Feb. 25, 2021

(86) PCT No.: PCT/GB2021/050486
§ 371 (c)(1),
(2) Date: Aug. 22, 2022

(87) PCT Pub. No.: WO2021/171026
PCT Pub. Date: Sep. 2, 2021

(65) Prior Publication Data
US 2023/0092173 A1 Mar. 23, 2023

(30) Foreign Application Priority Data
Feb. 25, 2020 (GB) ...................................... 2002611

(51) Int. Cl.
*H01Q 1/12* (2006.01)
*H01Q 1/32* (2006.01)
(Continued)

(52) U.S. Cl.
CPC ............. *H01Q 1/1271* (2013.01); *H01Q 1/32* (2013.01); *H01Q 1/521* (2013.01); *H01Q 9/30* (2013.01); *H01Q 1/38* (2013.01)

(58) Field of Classification Search
CPC ........ H01Q 1/1271; H01Q 1/32; H01Q 1/521; H01Q 9/30; H01Q 1/38
See application file for complete search history.

(56) References Cited

U.S. PATENT DOCUMENTS

2003/0034172 A1 2/2003 Alpen et al.
2005/0024279 A1* 2/2005 Kuehne .................... H01Q 9/42 343/713
(Continued)

FOREIGN PATENT DOCUMENTS

EP 3091610 A1 11/2016
EP 3291370 A1 3/2018
(Continued)

OTHER PUBLICATIONS

GB Search Report for GB Application No. 2002611.8 dated Aug. 17, 2020. (2 pages).
(Continued)

*Primary Examiner* — Daniel D Chang
(74) *Attorney, Agent, or Firm* — BUCHANAN INGERSOLL & ROONEY PC

(57) ABSTRACT

A glazing comprises a ply of glazing material; an antenna at least partly disposed on the ply of glazing material comprising a feed point at one end thereof for connecting to an external circuit; an electronic device positioned on or near the glazing for emitting a frequency; and an anti-antenna for at least partly cancelling the frequency connected to the antenna by a bridge and extending back towards the feed point parallel with the antenna to an end.

19 Claims, 7 Drawing Sheets

(51) Int. Cl.
*H01Q 1/38* (2006.01)
*H01Q 1/52* (2006.01)
*H01Q 9/30* (2006.01)

(56) References Cited

U.S. PATENT DOCUMENTS

2007/0097000 A1 5/2007 Sugimoto et al.
2011/0115681 A1* 5/2011 Oshima .................... H01Q 5/40
343/713

FOREIGN PATENT DOCUMENTS

| | | | |
|---|---|---|---|
| EP | 3534457 | A1 | 9/2019 |
| GB | 2216341 | A | 10/1989 |
| JP | H0310404 | A | 1/1991 |
| JP | H06112716 | A | 4/1994 |
| JP | H098527 | A | 1/1997 |
| JP | 2000174529 | A | 6/2000 |
| JP | 2011101190 | A | 5/2011 |
| WO | 2011077142 | A1 | 6/2011 |
| WO | 2014087142 | A1 | 6/2014 |
| WO | 2017194961 | A1 | 11/2017 |
| WO | 2019192707 | A1 | 10/2019 |

OTHER PUBLICATIONS

International Search Report (PCT/ISA/210) and Written Opinion (PCT/ISA/237) mailed on May 26, 2021, by the European Patent Office as the International Searching Authority for International Application No. PCT/GB2021/050486. (12 pages).

* cited by examiner

GLAZING COMPRISING AN ANTENNA AND METHOD OF MANUFACTURING THE SAME AND USE OF THE SAME

FIELD OF THE INVENTION

The invention concerns a glazing having an antenna and a method of manufacturing said glazing. The invention solves a problem due to interference from an electronic device.

BACKGROUND OF THE INVENTION

Glazings having antennas for receiving or transmitting electromagnetic waves are known. Such glazings in vehicles have antennas for radio (AM, FM), mobile network "Long Term Evolution" (LTE), digital audio broadcasting (DAB), television (TV), digital video broadcasting-terrestrial (DVB-t), telephone (GSM), navigation (GPS), WLAN, remote keyless entry (RKE), car-to-car communication and car-to-infrastructure communication (car2X) and paging systems. An antenna on the glazing may have poor performance due to Electro-Magnetic Interference (EMI) emitted by an electronic device (its antenna or other conductor) positioned on the glazing or any other location.

WO2011077142A1 (Paulus) discloses a laminated vehicle glazing having a conductive panel defining a slot antenna, and a device emitting electromagnetic radiation. A conductive wire or a conductive print, electrically connected or capacitively coupled to the conductive panel and at least partially enclosing the device, serves to reduce EMI at the slot antenna.

WO2014087142A1 (Baranski) discloses two antennas in a glazing, each antenna connected to a coupling electrode, arranged so that alternating current coupling occurs between the coupling electrodes. Unwanted direct current contact between a coupling electrode and other conductors is avoided by using insulation.

EP3534457A1 (Nagata) discloses a window glass, near which an electronic device is to be disposed, comprising an antenna on a glass plate and a linear canceller also on the glass plate to inhibit noise being received by the antenna from the electronic device.

An object of the invention is to provide a glazing having an antenna which reduces unwanted interference from other antennas or electronic devices. Another object is to provide a method of manufacturing said glazing.

SUMMARY OF THE INVENTION

The present invention provides, in a first aspect according to claim 1, a glazing comprising a ply of glazing material, an antenna at least partly disposed on the ply of glazing material, comprising a feed point at one end thereof for connecting to an external circuit, an electronic device positioned on or near the glazing for emitting a frequency (F), an anti-antenna for at least partly cancelling the frequency (F), connected to the antenna by a bridge and extending back towards the feed point parallel with the antenna to an end.

Preferably, a length (A) from the bridge to the end divided by a first shortening factor (K1) of the anti-antenna is an odd multiple of a quarter wavelength in free space +/−25% of the frequency (F).

Preferably, the electronic device is a second antenna having a length (A') and a feed point wherein the length (A') divided by a second shortening factor (K2) of the second antenna is an odd multiple of a quarter wavelength in free space +/−25% of the frequency (F).

Preferably, a distance (B) from the feed point to the end divided by a third shortening factor (K3) between the feed point and the end is a multiple of a half wavelength in free space +/−25% of the frequency (F).

The first, second or third shortening factor (K1, K2, K3) for laminated glass is typically 0.6 and for monolithic toughened glass is typically 0.7.

Preferably, the anti-antenna is a filter to cancel interference from the second antenna at the frequency (F) or a plurality of anti-antennas (5) is a plurality of filters to cancel interference from a plurality of electronic devices (2) at a plurality of frequencies (F).

In an embodiment, the length (A) is from 300 to 500 mm, preferably from 360 to 450 mm for anti-FM function. In another embodiment, preferably the length (A) is from 50 to 70 mm, more preferably 60 to 65 mm for anti-LTE function.

In an embodiment, a gap (G) between the antenna and the anti-antenna is from 20 to 40 mm, preferably 28 to 32 mm for anti-FM function; or a gap (G) between the antenna and the anti-antenna is from 1 to 6 mm, preferably 3 to 4 mm for anti-LTE function.

Preferably, the antenna further comprises a connector extending from the feed point to a connection point on the first ply of glazing material.

Preferably, said connector is a flat cable and the anti-antenna and the bridge are configured on the flat cable.

Preferably, the external circuit comprises an amplifier connected to the feed point and positioned on or near the glazing.

Preferably, the second antenna is arranged in a vehicle bumper or a vehicle roof.

Preferably, the first ply of glazing material is toughened glass.

Preferably, the glazing further comprises a second ply of glazing material bonded to the first ply of glazing material by a ply of interlayer material to form a laminated glass.

The glazing may have any suitable shape, for example trapezoidal, rectangular or triangular. Glazing thickness including all glazing material, interlayer material and conductors may be any thickness, for example 2.5 mm to 10.6 mm, preferably 2.6 mm to 3.8 mm, more preferably 2.7 mm to 3.2 mm. Glazing material may be any suitable material, for example soda-lime-silica glass or borosilicate glass. Preferably anti-antenna, bridge and antenna are copper wire, diameter 0.05 to 0.15 mm, or silver print, thickness 0.1 to 2 mm. Bridge and antenna may be connected galvanically or by capacitive coupling.

First and second glass sheets may be formed by the float process and may be annealed. Glass sheets may be heat strengthened or tempered (toughened). In a laminated glass, the first glass sheet may be an inner ply of glazing material and the second glass sheet may be an outer ply of glazing material, or vice versa.

The glazing may comprise one or more plies of interlayer material, for example polyvinyl butyral (PVB) which is advantageous because it exhibits good adhesion after lamination to glass. Interlayer material may have any thickness, for example 0.76 mm.

The present invention provides, in a second aspect according to claim 14 a method of manufacturing the glazing comprising steps: providing a ply of glazing material, disposing an antenna at least partly on the ply of glazing material, the antenna comprising a feed point at an end of the antenna for connecting to an external circuit, positioning an electronic device on or near the glazing for emitting a frequency (F), providing an anti-antenna for at least partly cancelling the frequency (F) connected to the antenna by a bridge and extending back towards the feed point parallel with the antenna to an end.

The present invention provides, in a third aspect according to claim 15, use of the glazing as a window in a building or in a vehicle, as a windscreen, side window, rear window or roof window.

Effect of the Invention

The present invention provides a glazing having an antenna at least partly disposed on the glazing, and an anti-antenna for at least partly cancelling a frequency (F) due to an electronic device on or near the glazing. The invention is highly advantageous because a signal at a feed point of the antenna is filtered by the anti-antenna to cancel interference and thereby improve signal to noise ratio for an external circuit connected to the feed point.

The anti-antenna extending from a bridge back towards the feed point parallel with the antenna to an end is not disclosed in prior art. The bridge connects the anti-antenna to a fork point on the antenna. Extending back towards the feed point overcomes a technical prejudice that the end of an antenna is far from the feed point. Surprisingly, the invention provides an antenna having two ends, one near the feed point as part of an anti-antenna for cancelling a frequency (F), the other far from the feed point for receiving other frequencies.

The invention provides a method of manufacturing the glazing having a surprising step of extending the anti-antenna back towards the feed point for cancelling a frequency (F). This method avoids steps of providing alternative signal processing parts at the feed point or in the external circuit.

Use of a glazing according to the invention in buildings and vehicles is advantageous because standard external circuits, for example amplifiers, can be connected to the feed point needing less effort for signal processing to suppress electromagnetic interference from other electronic devices in use.

DETAILED DESCRIPTION OF THE DRAWINGS

The following is a description of the invention with reference to the drawings in which like references are used. Embodiments of the invention are described as non-limiting examples.

Figure 1:
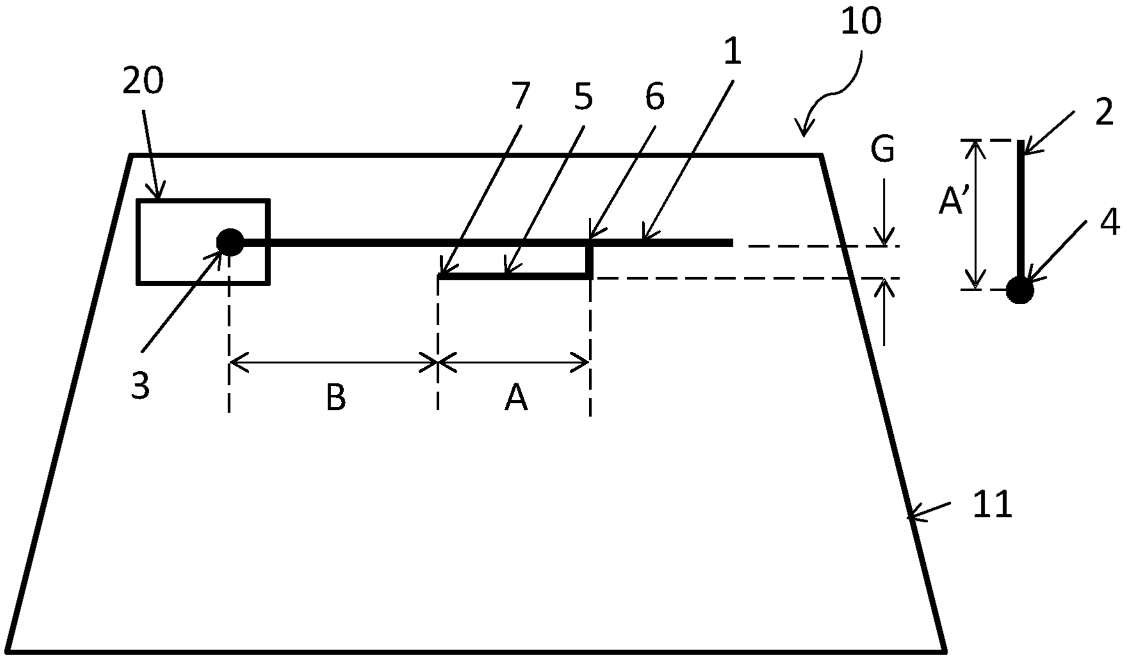
FIG. 1 is a plan view of a glazing according to the invention having an antenna and an anti-antenna on the glazing and an electronic device near the glazing.

FIG. 1 discloses a glazing (10) comprising a ply of glazing material (11). An antenna (1) is disposed on the ply of glazing material (11), comprising a feed point (3) at one end for connecting to an external circuit (20). An electronic device (2) is positioned on or near the glazing (10) for emitting a frequency (F). An anti-antenna (5) for at least partly cancelling the frequency (F) is connected to the antenna (1) by a bridge (6) and extends back towards the feed point (3) parallel with the antenna (1) to an end (7).

The anti-antenna (5) has a length (A) from the bridge (6) to the end (7). A distance (B) is from the end (7) to the feed point (3). A gap (G) is between the antenna (1) and the anti-antenna (5). The electronic device (2) may be a second antenna (2) having a second feed point (4) and a length (A'). The electronic device (2) can be on part of a building or on a part of a vehicle, for example a bumper or a roof.

The anti-antenna (5) may have a length (A) from the bridge (6) to the end (7) divided by a first shortening factor (K1) of the anti-antenna (5) equal to an odd multiple of a quarter wavelength in free space +/−25% of the frequency (F).

The second antenna (2) may have a length (A') and a feed point (4) wherein the length (A') divided by a second shortening factor (K2) of the second antenna (2) is an odd multiple of a quarter wavelength in free space +/−25% of the frequency (F).

The distance (B) from the feed point (3) to the end (7) divided by a third shortening factor (K3) between the feed point (3) and the end (7) is a multiple of a half wavelength in free space +/−25% of the frequency (F).

Figure 2:
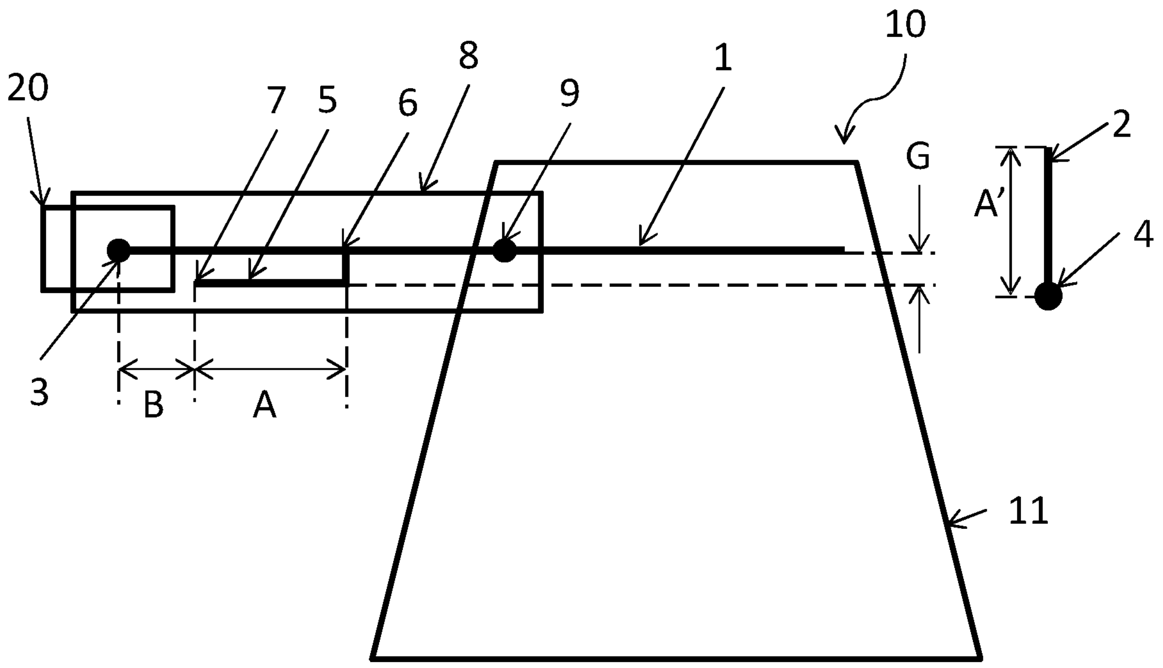
FIG. 2 is a plan view of a glazing according to the invention having an antenna partly on the glazing and partly on a connector, whereby an anti-antenna is on the connector.

FIG. 2 discloses a glazing (10) like FIG. 1, except the antenna (1) is disposed partly on the ply of glazing material (11) and partly on a connector (8). A connection point (9) serves to connect a part of the antenna (1) on the connector (8) with a part of the antenna (1) on the ply of glazing material (11). The feed point (3) is on the connector (8) and connects to the external circuit (20), which can be on a window frame of a building or on a body of a vehicle. The anti-antenna (5) for at least partly cancelling the frequency (F) is positioned on the connector (8) and is connected to the antenna (1) by a bridge (6) and extends back towards the feed point (3) parallel with the antenna (1) to an end (7).

Figure 3:
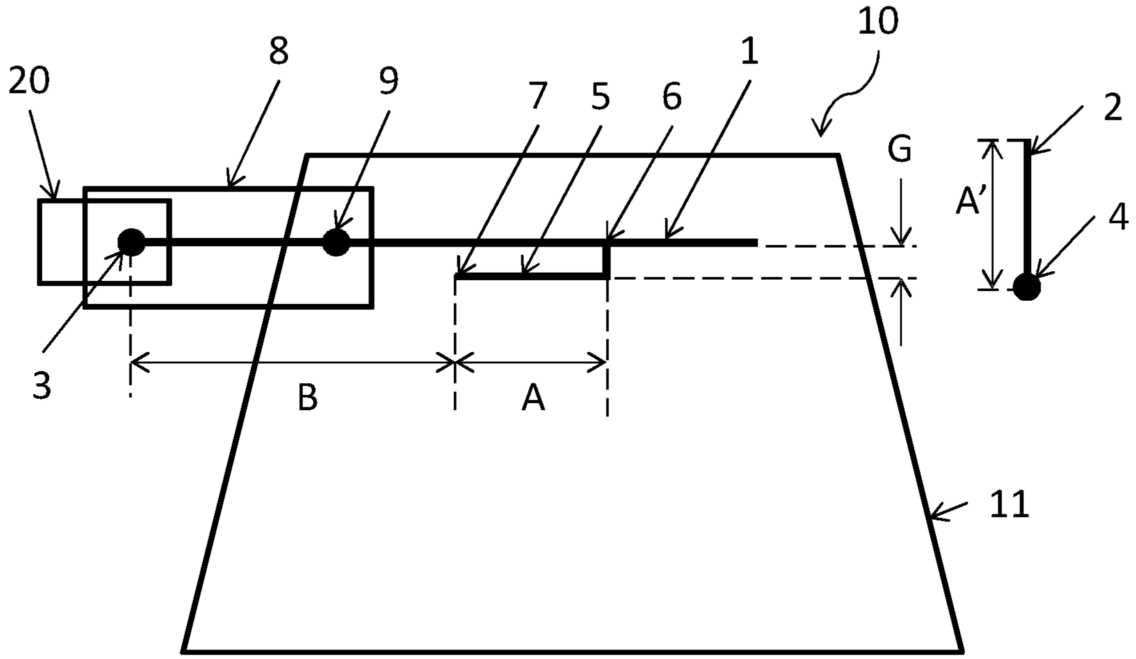
FIG. 3 is a plan view of a glazing according to the invention like FIG. 2, whereby an anti-antenna is on the glazing.

FIG. 3 discloses a glazing (10) like FIG. 2, except the anti-antenna (5) for at least partly cancelling the frequency (F) is positioned on the ply of glazing material (11) and is connected to the antenna (1) by a bridge (6) and extends back towards the feed point (3) parallel with the antenna (1) to an end (7).

Figure 4:
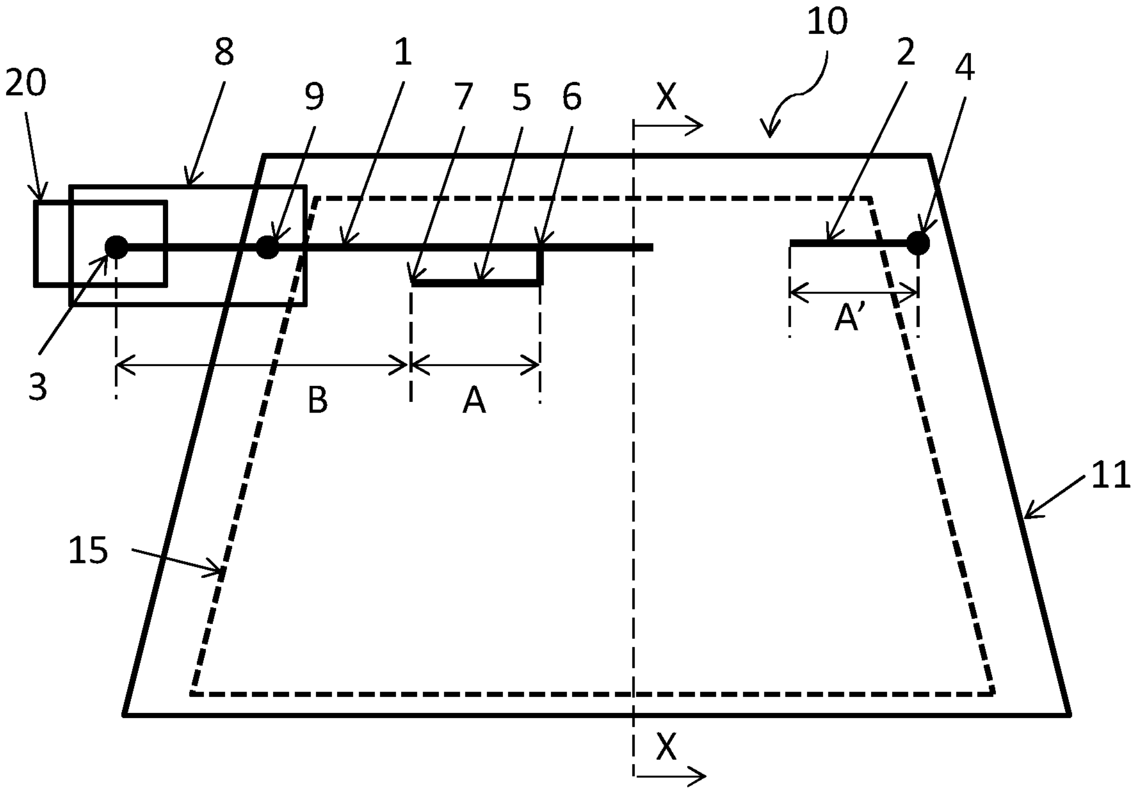
FIG. 4 is a plan view of a glazing according to the invention like FIG. 3, whereby the electronic device is a second antenna on the glazing.

FIG. 4 discloses a glazing (10) like FIG. 3, except the electronic device (2) is a second antenna (2) and is positioned on the glazing (10). Shortening factors (K1, K2) for the antenna (1) and second antenna (2) are similar in this embodiment so the lengths (A, A') are also similar.

Figure 5A:
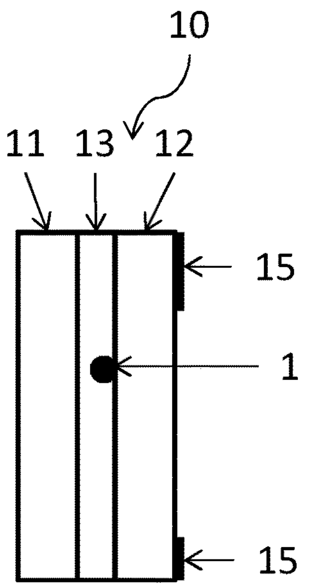
FIG. 5A and FIG. 5B show a cross-section of a glazing according to the invention like FIG. 1 to FIG. 4, whereby the glazing is a laminated glass.
Figure 5B:
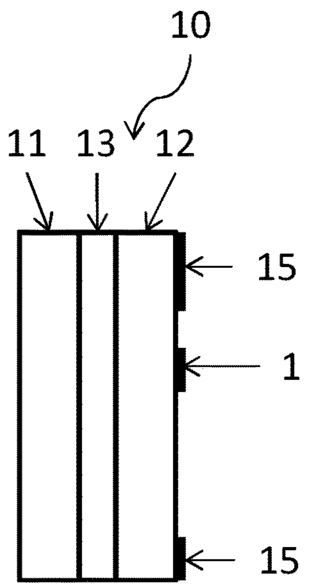

FIG. 5A discloses a glazing (10) like FIG. 4, in cross-section on the line X-X, where the first ply of glazing material (11) is bonded to a second ply of glazing material (12) by a ply of interlayer material (13) to form a laminated glass and antenna (1) is an embedded wire. FIG. 5B is like FIG. 5A but antenna (1) is printed on surface 4, numbered from the outside.

Figure 6:
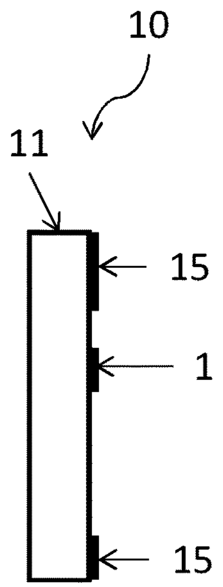
FIG. 6 is a cross-section of a glazing according to the invention like FIG. 1 to FIG. 4, whereby the glazing is monolithic glass.

FIG. 6 discloses a glazing (10) like FIG. 4, in cross-section on the line X-X, where the first ply of glazing material (11) is a monolithic (single ply) of toughened glass.

Figure 7:
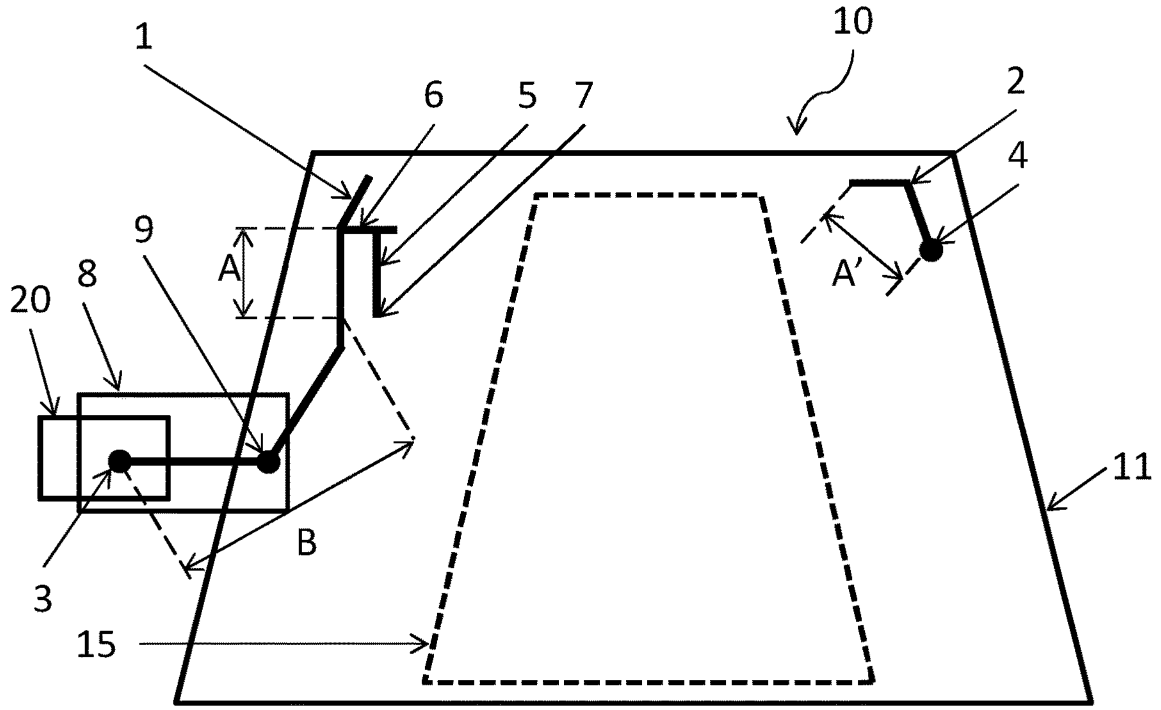
FIG. 7 is a plan view of a glazing according to the invention like FIG. 4, whereby the antenna and the second antenna have complex shapes.

FIG. 7 discloses a glazing (10) like FIG. 4, except the antenna (1) and the second antenna (2) have complex shapes.

For example, the antenna (1) may extend away from the feed point (3) via a plurality of knee points. FIG. 7 shows three knee points: the connection point (9), a point between the connection point (9) and the end (7) of the anti-antenna (5), and the fork point where the bridge (6) connects to the antenna (1).

Example 1 and Comparative Example

The following is a description of examples of the present invention. The present invention is not limited thereby. A comparative example is also described.

Figure 8:
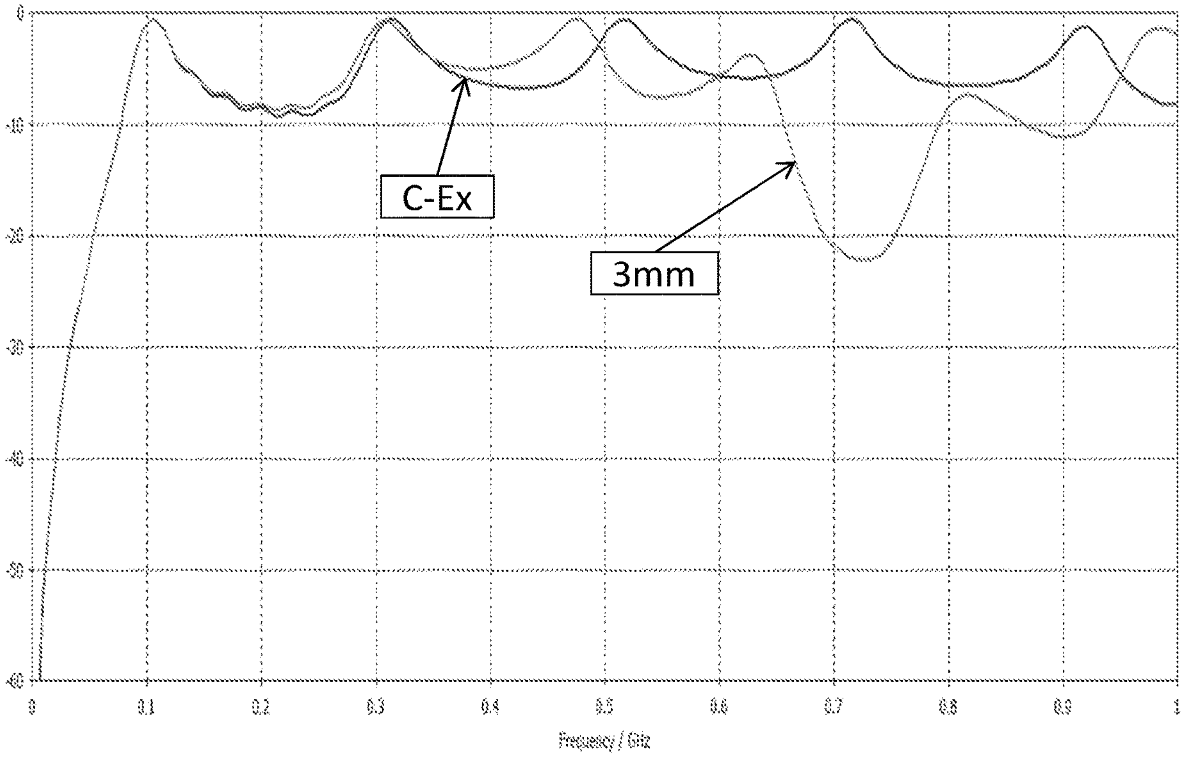
FIG. 8 is a graph of radiation efficiency (dB) versus frequency (GHz) for a comparative example (C-Ex) and an embodiment of the invention having a gap (G) of 3 mm.

FIG. 8 shows radiation performance for a Comparative Example (C-Ex) of a glazing (10) having a monopole antenna (1) and Example 1 additionally having an anti-antenna (5) according to the invention and a gap (G) of 3 mm.

The antenna (1) has length equivalent to 0.725 m in free space. For the Comparative Example (C-Ex) and Example 1, a lowest frequency at which peak radiation efficiency occurs is when the length is a quarter wavelength, i.e. wavelength 2.900 m and frequency 103 MHz, i.e. FM radio.

For the Comparative Example (C-Ex), similar peak radiation efficiency also occurs at a harmonic frequency, approximately 720 MHz. The harmonic frequency peak is undesirable because LTE signals transmitted by an electronic device (2), for example a mobile phone antenna, are received as interference at the feed point (3) of the antenna (1). LTE band is nominally 700 MHz; user equipment transmits 703 to 748 MHz and receives 758 to 803 MHz.

Example 1 comprises an anti-antenna (5) having a length (A) equivalent to 0.100 m in free space. Lowest frequency at which resonance occurs in the anti-antenna (5) is when the length (A) is a quarter of a wavelength, i.e. wavelength 0.400 m and frequency 750 MHz.

The anti-antenna (5) positioned adjacent the antenna (1) and separated therefrom by the gap (G) 3 mm causes peak attenuation of radiation efficiency −22 dB at 720 MHz. Attenuation occurs from 630 to 810 MHz, i.e. filter bandwidth is 180 MHz.

Examples 2 and 3

Figure 9:
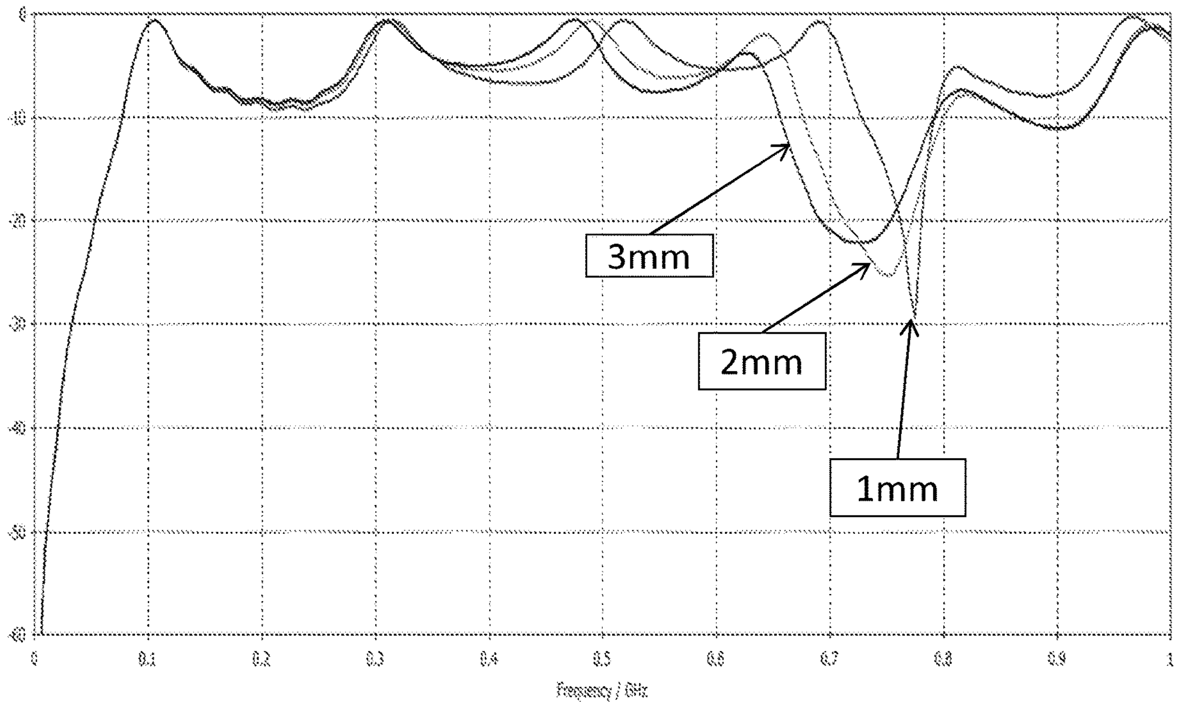
FIG. 9 is a graph of radiation efficiency (dB) versus frequency (GHz) for three embodiments of the invention having a gap (G) of 3 mm, 2 mm and 1 mm respectively.
Figure 10:
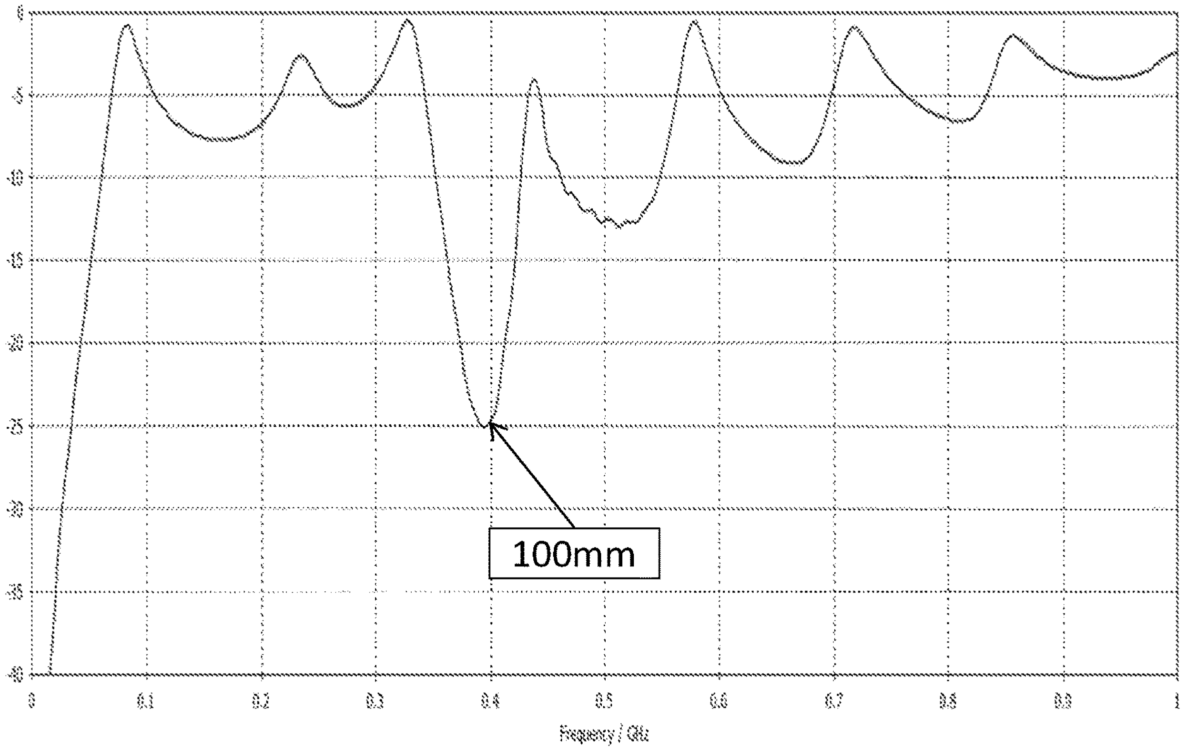
FIG. 10 is a graph of radiation efficiency (dB) versus frequency (GHz) for an embodiment of the invention having length 100 mm.
Figure 11:
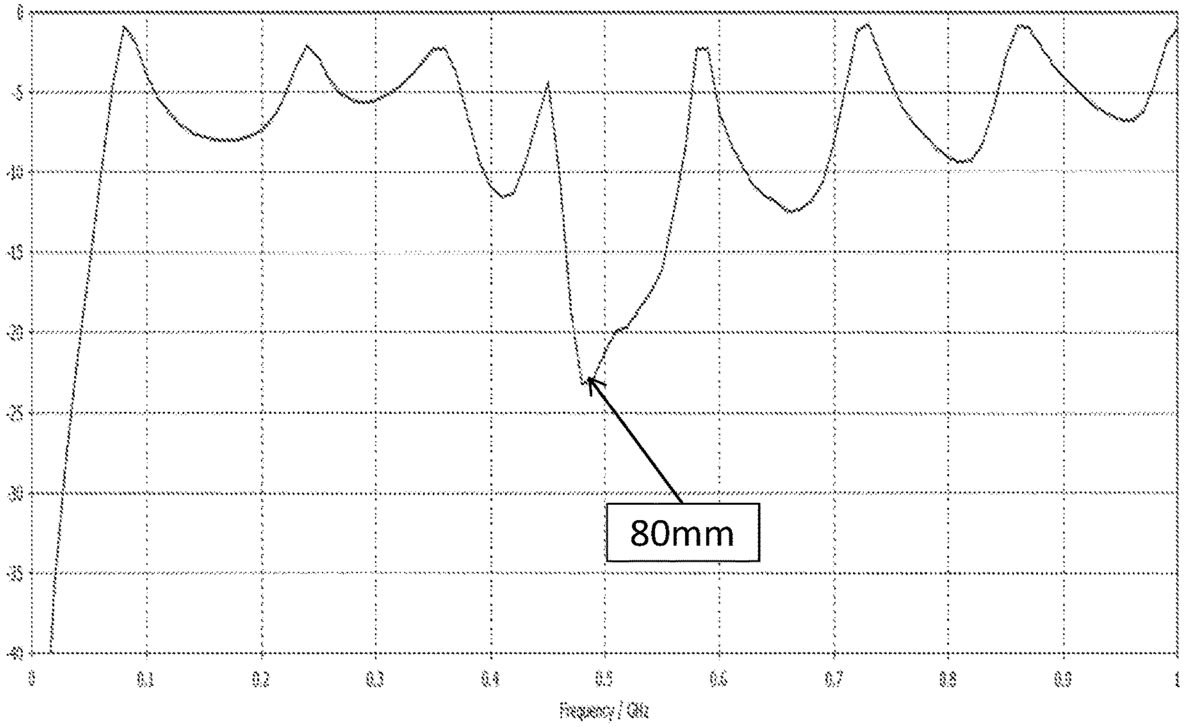
FIG. 11 is a graph of radiation efficiency (dB) versus frequency (GHz) for an embodiment of the invention having length 80 mm.
Figure 12:
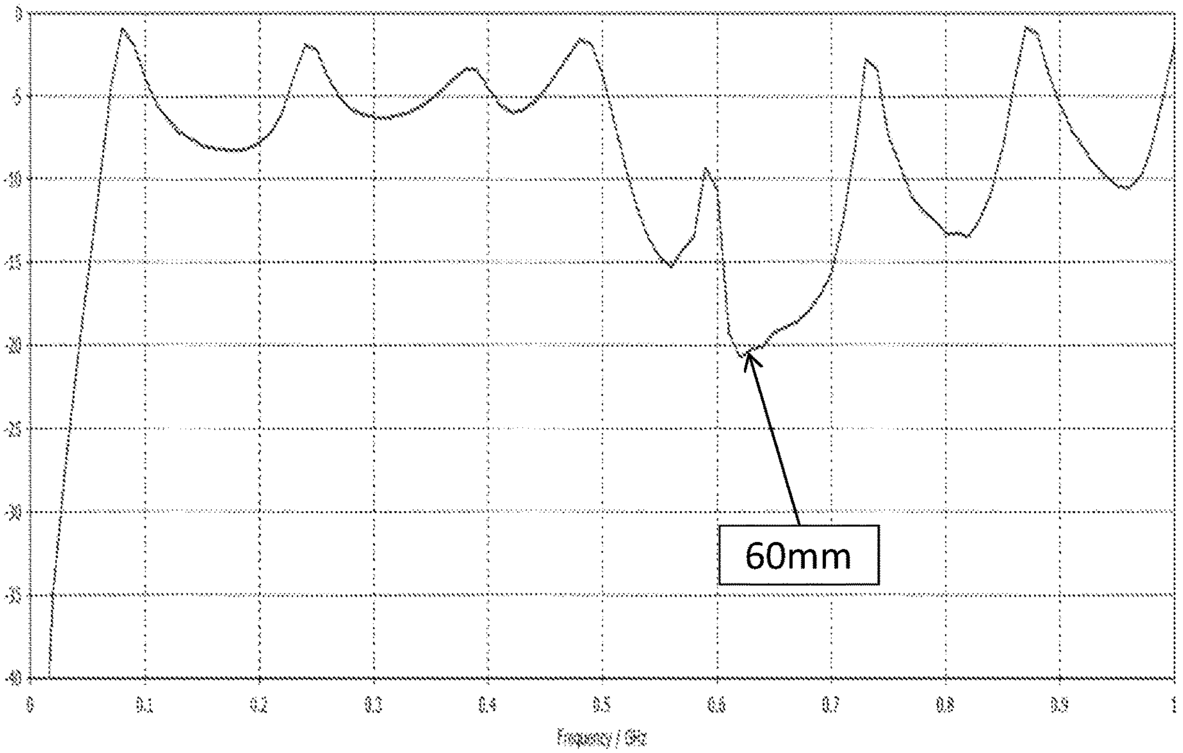
FIG. 12 is a graph of radiation efficiency (dB) versus frequency (GHz) for an embodiment of the invention having length 60 mm.

FIG. 9 discloses radiation efficiency (dB) for Example 1, Example 2 and Example 3, having the gap (G) of 3 mm, 2 mm and 1 mm respectively.

Attenuation becomes stronger as the gap (G) becomes narrower. Example 3 having the gap (G) 1 mm causes radiation efficiency to reduce to −29 dB.

Attenuation occurs over a smaller frequency range as gap (G) becomes narrower. In Example 3, attenuation occurs from 690 to 810 MHz, i.e. filter bandwidth is 120 MHz.

Due to narrow bandwidth, the anti-antenna (5) has no influence on FM/DAB/TV.

Examples 4, 5, 6 and 7

A set of four examples uses a ply of glazing material (11) having thickness 3.15 mm and an antenna (1) deposited as silver print having thickness 0.01 mm, width 1 mm and length 0.7 m. An anti-antenna (5) is deposited parallel thereto with a gap (G) of 10 mm.

FIG. 10, FIG. 11, FIG. 12, and FIG. 13 disclose Examples 4, 5, 6 and 7 respectively, wherein the anti-antenna length (A) is 100 mm, 80 mm, 60 mm and 40 mm respectively.

Figure 14:
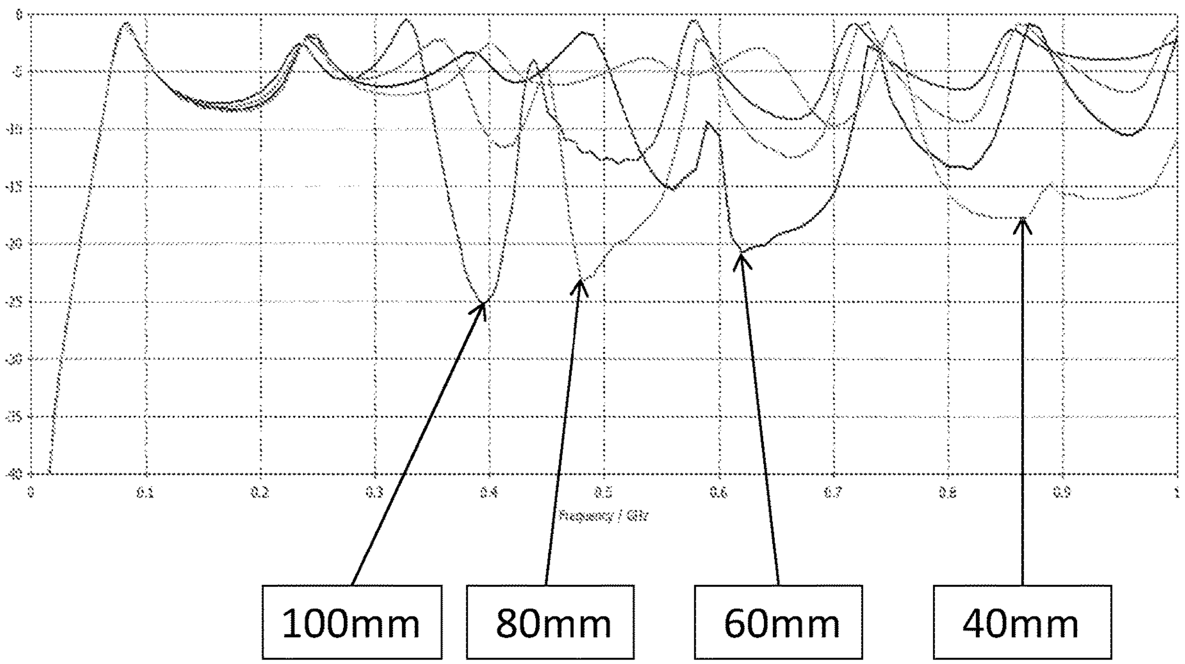
FIG. 14 is a graph of radiation efficiency (dB) versus frequency (GHz) for four embodiments of the invention having anti-antenna length 100 mm, 80 mm, 60 mm and 40 mm respectively, as shown individually in FIG. 10, FIG. 11, FIG. 12 and FIG. 13.

FIG. 14 shows the four examples together, to aid selection of the length (A) suitable for a predetermined frequency (F) to be filtered. For example, digital TV band is nominally 800 MHz, but user equipment receives 791 to 821 MHz. To attenuate interference from digital TV, anti-antenna length (A) 40 mm should be selected, to achieve attenuation −15 dB.

Figure 13:
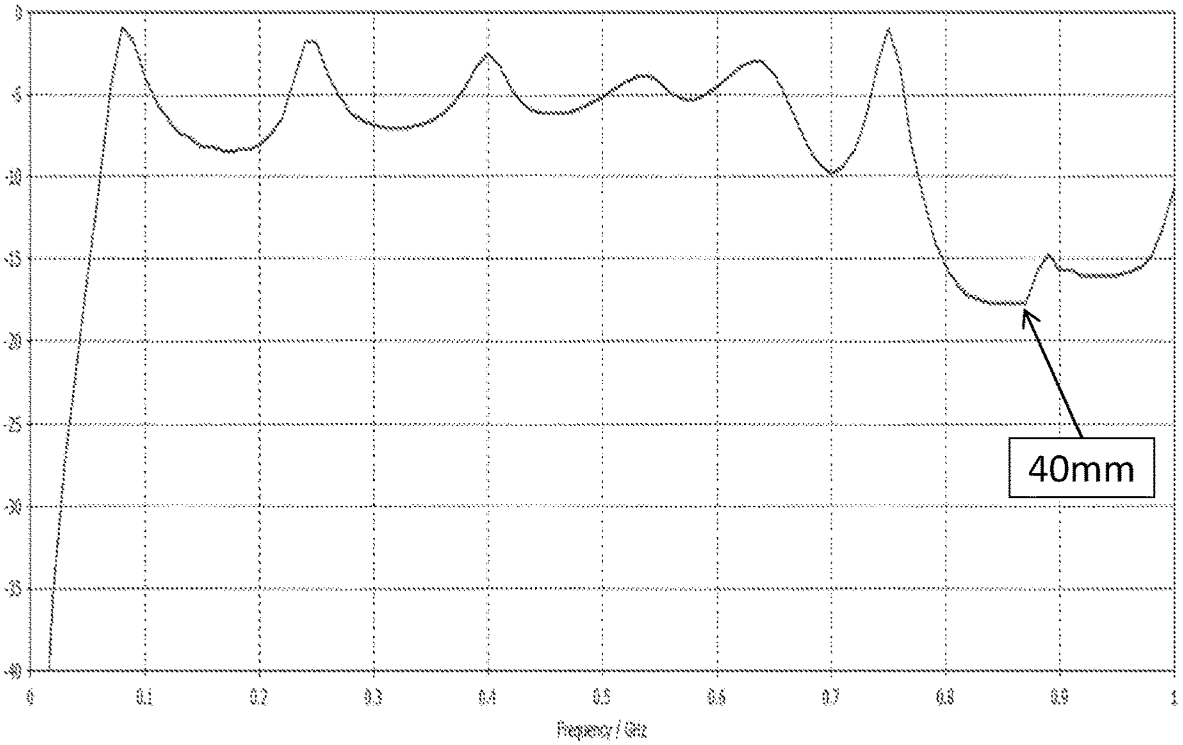
FIG. 13 is a graph of radiation efficiency (dB) versus frequency (GHz) for an embodiment of the invention having length 40 mm.

Having selected 40 mm (Example 7), the individual graph of FIG. 13 confirms that the anti-antenna has no influence on FM radio (88 to 108 MHz) or DAB (174 to 240 MHz).

In case of a requirement for TV transmission 750 to 800 MHz, then anti-antenna length (A) of approximately 50 mm can be inferred from FIG. 14, being intermediate between 60 mm (590 to 720 MHz, Example 6) and 40 mm (760 to 1,000 MHz, Example 7).

Length (A) depends on a dielectric factor of the ply of glazing material (11) or the connector (8) acting as a substrate for the anti-antenna (5). To make samples, first shortening factor (K1) can be estimated as 0.7 for toughened glass, 0.6 for laminated glass or 0.5 for coated glass with laser etching lines. Samples should be tested in an anechoic chamber to measure actual frequencies filtered. To make a prototype, the actual frequencies filtered should be compared with the predetermined frequency (F) and length (A) made shorter or longer according to a revised estimate of the first shortening factor (K1). Similar estimating and testing can be used for length (A') of the second antenna (2), distance (B) and corresponding second and third shortening factors (K2, K3).

Example 8

Example 8 is a laminated glazing (10) as FIG. 1. Distance (B) from the end (7) to the feed point (3), divided by a third shortening factor (K3), is a multiple n of a half wavelength in free space +/−25% of the frequency (F), where n is any integer (0, 1, 2 . . . ). To attenuate LTE signals, distance (B)

is 125 mm, divided by 0.6 is 208 mm, full wavelength 0.416 m, i.e. a frequency of 720 MHz.

Multiple Anti-Antennas

A plurality of anti-antennas (5) may be provided on an antenna (1) each having a length (A1, A2, etc.) to cancel a predetermined frequency (F1, F2, etc.). This is advantageous to filter a plurality of undesired frequencies at the feed point (3) to an amplifier (20).

Anti-Antenna Having a Complex Shape

Figure 15:
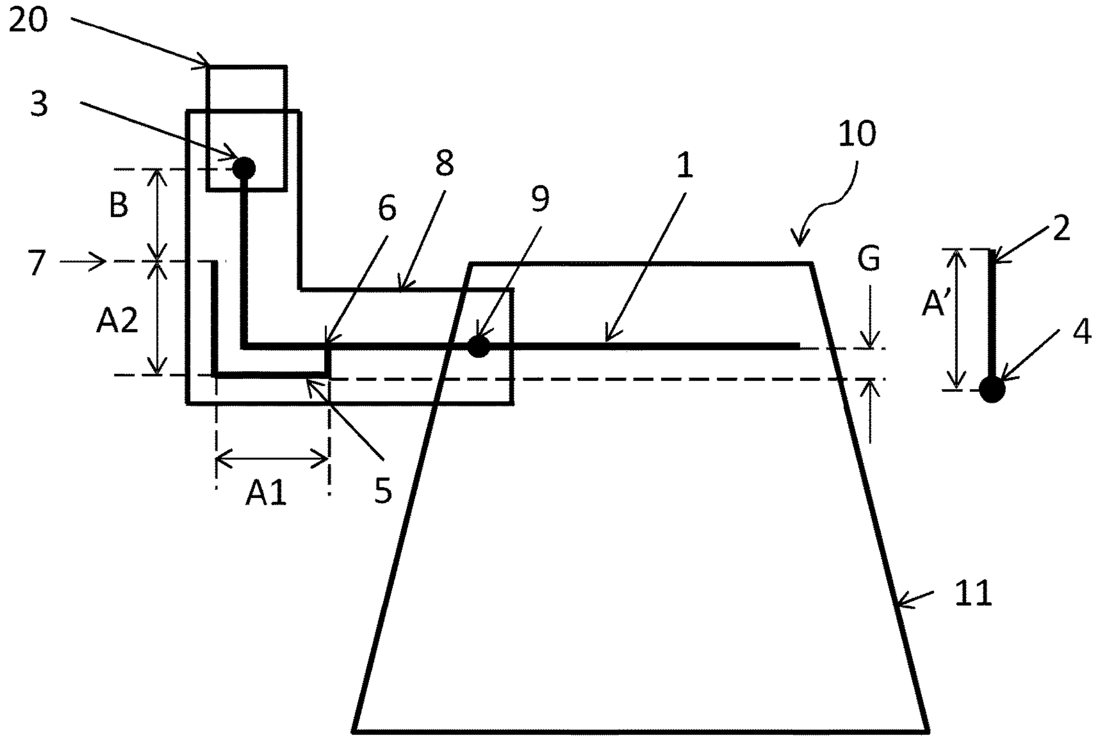
FIG. 15 is a plan view of a glazing according to the invention like FIG. 2, whereby an anti-antenna has a complex shape.

FIG. 15 discloses a glazing (10) like FIG. 2, except the anti-antenna (5) has a complex shape corresponding to a complex shape of an antenna (1).

WO2017194961A1 (Baranski) incorporated by reference discloses a glazing wherein an antenna has a plurality of knee points forming a complex shape on a connector.

In FIG. 15 an antenna (1) comprises a connector (8) extending from a feed point (3) to a connection point (9) on a first ply of glazing material (11). According to the invention, an anti-antenna (5) having a knee point corresponding to a knee point of the antenna (1) is positioned on the connector (8).

Total length of an anti-antenna (5) having a complex shape is a sum of parts, for example two parts having lengths A1, A2. Length A1 is from the bridge (6) to the knee point. Length A2 is from the knee point to the end (7) of the anti-antenna (5). A knee point means a bend between two straight sections.

KEY TO THE DRAWINGS

1: Antenna
2: Electronic device
3: Feed point of antenna
4: Feed point of electronic device
5: Anti-antenna
6: Bridge
7: End of anti-antenna
8: Connector
9: Connection point
10: Glazing
11, 12: First and second plies of glazing material
13: Ply of interlayer material
15: Frame
20: External circuit
A: Length of anti-antenna; A1, A2: Lengths of parts; A': Length of electronic device
B: Distance from feed point to end of anti-antenna
F: Frequency emitted by electronic device
G: Gap between antenna and anti-antenna
K1, K2, K3: First, second and third shortening factors

The invention claimed is:

1. A glazing comprising:

a ply of glazing material;

an antenna at least partly disposed on the ply of glazing material, the antenna comprising a feed point at one end thereof for connecting to an external circuit;

an electronic device positioned on or near the glazing for emitting a frequency; and an anti-antenna for at least partly cancelling the frequency connected to the antenna by a bridge and extending back towards the feed point parallel with the antenna to an end, wherein a length from the bridge to the end divided by a first shortening factor of the anti-antenna is an odd multiple of a quarter wavelength in free space +/−25% of the frequency.

2. The glazing according to claim 1, wherein the electronic device is a second antenna having a length and a feed point wherein the length divided by a second shortening factor of the second antenna is an odd multiple of a quarter wavelength in free space +/−25% of the frequency.

3. The glazing according to claim 1, wherein a distance from the feed point to the end divided by a third shortening factor between the feed point and the end is a multiple of a half wavelength in free space +/−25% of the frequency.

4. The glazing according to claim 1, wherein the anti-antenna is a filter to cancel interference from the second antenna at the frequency or a plurality of anti-antennas is a plurality of filters to cancel interference from a plurality of electronic devices at a plurality of frequencies.

5. The glazing according to claim 1, wherein the length from the bridge to the end is from 300 to 500 mm for anti-FM function, or is from 50 to 70 mm for anti-LTE function.

6. The glazing according to claim 1, wherein a gap between the antenna and the anti-antenna is from 20 to 40 mm for anti-FM function; or a gap between the antenna and the anti-antenna is from 1 to 6 mm for anti-LTE function.

7. The glazing according to claim 1, wherein the antenna further comprises a connector extending from the feed point to a connection point on the ply of glazing material.

8. The glazing according to claim 7, wherein the connector is a flat cable and the anti-antenna and the bridge are configured on the flat cable.

9. The glazing according to claim 1, wherein the external circuit comprises an amplifier connected to the feed point and positioned on or near the glazing.

10. The glazing according to claim 1, wherein the antenna is a first antenna and the electronic device is a second antenna, and the second antenna is arranged in a vehicle bumper or a vehicle roof.

11. The glazing according to claim 1, wherein the ply of glazing material is toughened glass.

12. The glazing according to claim 1, wherein the ply of glazing material is a first ply of glazing material, and further comprising a second ply of glazing material bonded to the first ply of glazing material by a ply of interlayer material to form a laminated glass.

13. A window in a building or in a vehicle, comprising the glazing according to claim 1.

14. The glazing according to claim 1, wherein the length from the bridge to the end is from 360 to 450 mm for anti-FM function, or is from 50 to 70 mm for anti-LTE function.

15. The glazing according to claim 1, wherein the length from the bridge to the end is from 300 to 500 mm for anti-FM function, or is from 60 to 65 mm for anti-LTE function.

16. The glazing according to claim 1, wherein the length from the bridge to the end is from 360 to 450 mm for anti-FM function, or is from 60 to 65 mm for anti-LTE function.

17. The glazing according to claim 1, wherein a gap between the antenna and the anti-antenna is from 28 to 32 mm for anti-FM function; or a gap between the antenna and the anti-antenna is from 3 to 4 mm for anti-LTE function.

18. The glazing according to claim 1, wherein the length from the bridge to the end is from 50 to 70 mm for anti-LTE function and a gap between the antenna and the anti-antenna is from 1 to 6 mm for anti-LTE function.

19. Method of manufacturing a glazing comprising:

providing a ply of glazing material;

disposing an antenna at least partly on the ply of glazing material, the antenna comprising: a feed point at an end of the antenna for connecting to an external circuit;

positioning an electronic device on or near the glazing for emitting a frequency;

providing an anti-antenna for at least partly cancelling the frequency, the anti-antenna being connected to the antenna by a bridge and extending back towards the feed point parallel with the antenna to an end, wherein a length from the bridge to the end divided by a first shortening factor of the anti-antenna is an odd multiple of a quarter wavelength in free space +/−25% of the frequency.

* * * * *